Aug. 3, 1965

W. W. PARKS 3,198,204

INLINE VALVE

Filed May 8, 1963

INVENTOR.
WILLIAM W. PARKS

BY

ATTORNEY

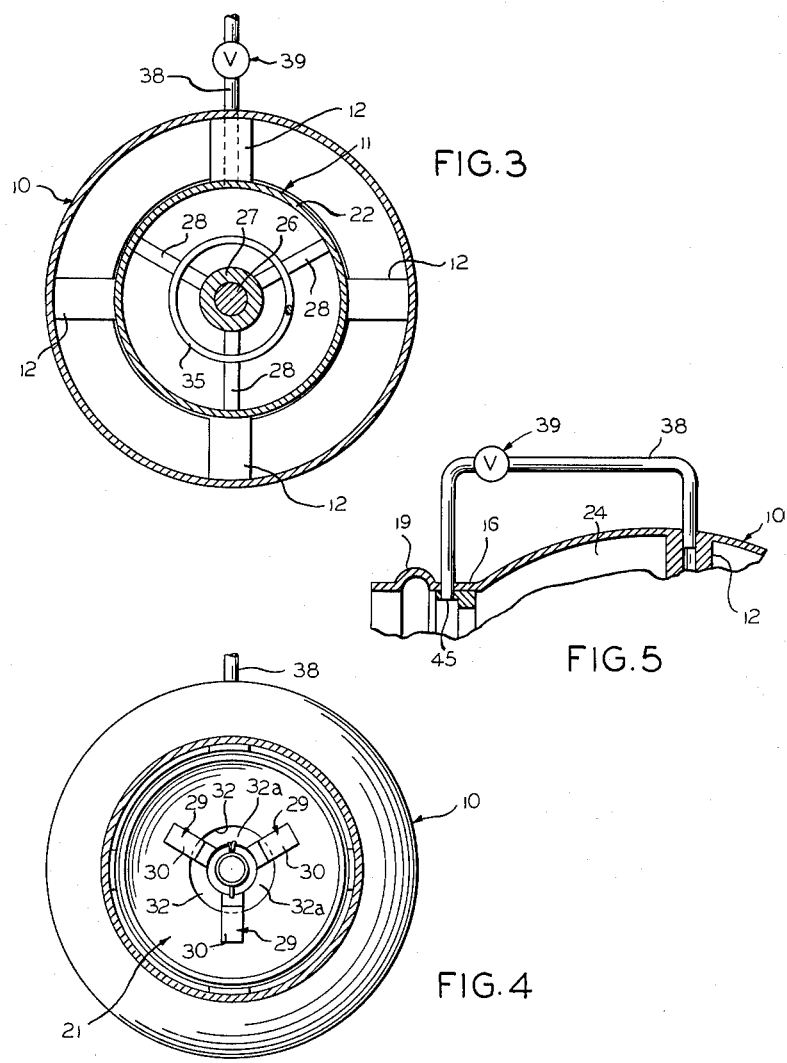

United States Patent Office 3,198,204
Patented Aug. 3, 1965

3,198,204
INLINE VALVE
William W. Parks, Glenview, Ill., assignor to Vapor Corporation, Chicago, Ill., a corporation of Delaware
Filed May 8, 1963, Ser. No. 278,844
10 Claims. (Cl. 137—219)

This invention relates to an inline valve for use in controlling the movement of fluid through a duct, and more particularly to a pilot-operated inline valve which permits a small size pilot member to operate a rather large valve seat.

The present valve is employed in aircraft structure and the like where it is highy desirous to have the parts made as small as possible as well as the pipes or ducts leading to and from the valve so as to minimize weight and also to enable installation of more components in a smaller area.

The inline valve of the present invention includes a tubular casing having a circular inlet and a circular outlet axially aligned therewith, and an "egg" or shell supported within the casing to define an annularly-shaped fluid channel between the inlet and outlet and to operate a piston and piston rod having a pair of discs thereon which coact with a seat at the outlet to open and close the valve. The piston rod is slidably mounted in the shell along the longitudinal axis thereof and in axial alignment with the inlet and outlet, and spring means is provided to normally bias the piston rod in the direction toward the outlet. The main disc on the piston rod is floatingly mounted thereon and is adapted to engage the seat. A suitable fluid passage means is provided about the piston rod and through the main disc which is closed by action of the pilot disc which seats against the main disc. The shell is closed at the end facing the inlet and open at the other end, and a compartment is defined in the closed end of the shell with the piston which may be selectively vented to a low pressure area for opening of the valve. Suitable bleed means is provided for bleeding the pressure of the fluid at the inlet into the compartment when the vent is closed. While the valve of the present invention may be employed generally for controlling movement of fluids, it is especially adaptable for air. However, it also could be used for gases or liquids.

It is desirous in an inline valve to provide the lowest possible pressure drop, and to accomplish this, it is necessary to decrease the ratio of the "egg" diameter to the duct or inlet diameter to as low a value as possible, preferably less than unity. Such is accomplished by the structure in the present invention.

In a heretofore conventional value, the difference in area between the piston diameter and main valve disc diameter is what determines the opening forces of the valve. Therefore if the ratio of the egg diameter to the duct diameter is too small, then there is insufficient differential area to open the valve against the restoring force of the piston spring and the frictional forces involved.

It is an object of the present invention to provide a fluid inline valve which overcomes the difficulties above set forth, and wherein an improved pilot-operated inline valve permits a small size pilot member to operate a rather large valve seat.

Another object of the present invention resides in the provision of an inline valve with a low pressure drop and having the smallest external size possible.

A still further object of this invention is to provide an inline valve wherein the relative diameters of the egg structure and the duct is no greater than unity.

Other objects, features, and advantages of the invention will be apparent from the following detailed disclosure, taken in conjunction with the accompanying sheets of drawings, wherein like reference numerals refer to like parts, in which:

FIG. 3 is a transverse sectional view of the inline valve, taken substantially along line 3—3 of FIG. 1;

FIG. 4 is a transverse sectional view of the inline valve, taken substantially along the line 4—4 of FIG. 1; and FIG. 5 is a fragmentary sectional view of the inline valve of the present invention modified for handling gases and liquids where no loss of gas or liquid is desired, although this modification could also be employed for air.

Figure 1:
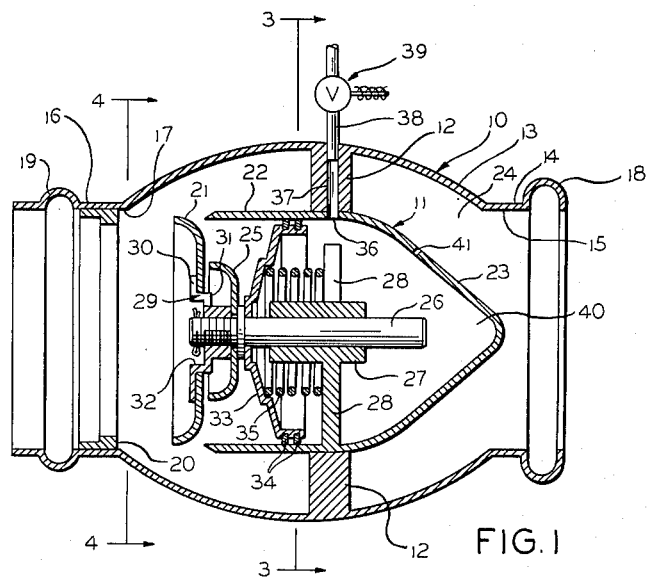
FIG. 1 is an axial sectional view of the inline valve of the present invention especially adaptable for air and illustrating the valve in open position.
Figure 2:
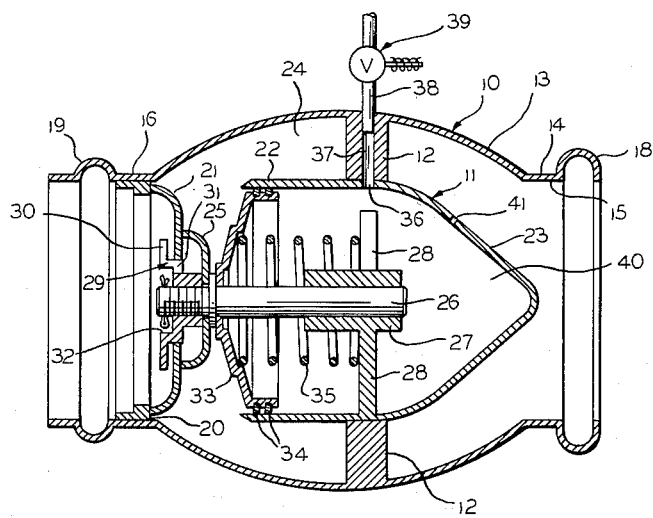
FIG. 2 is an axial sectional view of the inline valve of the present invention and illustrating the valve in closed position.

Referring now to the drawings, and particularly to FIGS. 1 and 2, the inline valve of the present invention includes generally a tubular casing or housing 10 and an egg or shell 11 arranged within the casing and suitably supported therein, such as by a plurality of spider or finger members 12.

The casing 10 includes a center bulb-like section 13, an annular cylindrical portion 14 at one end defining an inlet 15, and an annular cylindrical portion 16 at the other end defining an outlet 17. Flanged coupling members 18 and 19 are provided respectively at the inlet and outlet and for the purpose of coupling the valve to suitable ducts. An annular valve seat 20 is mounted at the outlet 17 and adapted to coact with a main bell-shaped valve disc 21 as will be hereinafter explained.

The egg or shell 11 includes a cylindrical section 22 open at the end facing the outlet 17 and closed at the end facing the inlet 15 by means of a conically shaped end portion 23. The inlet 15 and outlet 17 are axially aligned, and the longitudnial axis of the egg 11 is coincident with the axes of the inlet and outlet. A somewhat annularly-shaped fluid channel 24 is formed between the shell 11 and the inner surface of the casing 10.

The external diameter of the egg 11, this measurement taken along the cylindrical section 22, is no greater than the internal diameter of the inlet 15 which is equal and coincident with the duct diameter. This ratio of egg to duct diameter as in the present invention is necessary in order to provide as low as possible of a pressure drop across the valve. In order to be able to reduce this ratio to unity or less, a bell-shaped pilot disc 25 is provided to operate with the main disc 21 for opening and closing the valve.

Both discs 21 and 25 are mounted on a piston rod 26 that is slidably supported in a sleeve bearing 27 suitably supported within the egg, such as by a plurality of fingers or spiders 28. The pilot disc 25 is fixed to the piston rod 26, while the main disc 21 is floatingly mounted on a plurality of spiders 29 having stops 30 for limiting the movement of the disc 21 toward the seat 20 when the disc is lifted from the seat, and axially extending guide portions 31. The disc 21 is provided with a central opening 32 that defines an annular edge slidable along the guide portions 31. As may be seen particularly in FIG. 4, the opening 32 defines with the spiders 29 about the piston rod 26 a plurality of air passages 32a. The fixed pilot disc 25 seats on the main disc 21 when the valve is in closed position as shown in FIG. 2, and in this position, the main disc 21 engages the seat 20. When the valve is in open position, the main disc 21 slides axially against the stops 30 of the spiders 29.

A piston 33 is secured on the piston rod 26 and provided with sealing rings 34 engaging the inner surface of the egg cylindrical section 22. A coil spring 35 embraces the sleeve bearing 27 and the piston rod, and is bottomed at one end against the sleeve supporting fingers 28 and at the other end against the piston 33 so that the piston and piston rod are normally biased toward the outlet and valve seat 20.

A vent port 36 is provided in the wall of the egg 11 and in communication with a vent passage 37 in one of the supporting fingers 12. A pipe 38 is in communcation with the vent passage 37 and provided with a solenoid operated or otherwise suitable valve 39 for venting the fluid in the egg to atmosphere or a low pressure area. A compartment 40 is defined by the closed end 23 of the egg and the piston 33 which when having equal pressure with that which is in the channel 34 will permit the spring 35 and aerodynamic forces to close the valve, and when having atmospheric or low pressure will permit the valve to be open. A small bleed port 41 is provided in the egg 11 so as to permit the bleeding of the fluid pressure in the channel 34 into the compartment 40 when the valve 39 is closed and ultimately enable the valve to attain closed position. The size of the bleed port 41 is small with respect to the size of the vent port 36, thus permitting the pressure in compartment 40 to drop to a value very close to atmospheric.

Assuming the valve is in closed position as shown in FIG. 2, and it is desired to open the valve, the solenoid valve 39 is opened to vent the compartment 40 to atmospheric or low pressure, wherein the much higher pressure in the channel 24 operates against the outer face of the piston 33 and against the action of the spring 35 to cause the pilot disc 25 to lift from its seated position on the main disc 21 to uncover the fluid passages 32a, and thereafter cause the stops 30 to engage the main disc 21 with such inertia force as to lift the main disc from its seat. Additionally, the aerodynamic force or lift created by high velocity fluid flowing across the upstream side of the main disc 21 aids in lifting it from its seat. Therefore, a good low pressure opening can be obtained with a low egg to duct ratio and thereby permit the pressure drop across the valve to be minimized. In closing of the valve, the solenoid operated valve 39 is closed thereby permitting the pressure within the channel 24 to enter the compartment 40 through the bleed port 41, and when the pressure within the compartment is equalized to the pressure in the channel, the spring 35 will force the pilot and main discs into seated position to close the valve. First the pilot disc 25 will engage and seat against the main disc 21 and cover the air passages 32a, and thereafter force the main disc 21 against the seat 20.

The embodiment of FIGS. 1–4 shows venting of the compartment 40 to atmospheric pressure and is principally useful for handling air where loss or dumping of the air from within the compartment 40 to atmosphere is immaterial. However, gas or liquid could also be handled by this embodiment.

Where it is desired to avoid loss of fluid or dumping of fluid to atmosphere, as would generally be desirable with a gas or liquid and sometimes air, the embodiment of FIG. 5 would be employed. In this embodiment, the pipe 38 is connected downstream of the valve seat 20 as at 45. Thus, the pipe 38 would be connected to a low pressure area and thereby permit selective dumping of the high pressure fluid within the compartment downstream of the valve seat to operate the valve, without loss or dumping of the fluid to the atmosphere.

It will be understood that modifications and variations may be effected without departing from the scope of the novel concepts of the present invention, but it is understood that this application is to be limited only by the scope of the appended claims.

The invention is hereby claimed as follows:

1. An inline fluid valve comprising, a tubular casing having an inlet and an outlet axially aligned therewith, a cylindrical shell suported within said casing and axially aligned with said inlet and outlet, the external diameter of said shell being no greater than that of the inlet, the end of said shell adjacent the inlet being closed and the end thereof adjacent the outlet being open, a piston received in said shell and having a piston rod axially and slidably suported therein, spring means normally biasing said piston toward said outlet, a seat at said outlet, first and second discs mounted on said rod and coacting with said seat to close said outlet, one of said discs being substantially equal in diameter to said piston and being adapted to engage said seat and being floatingly connected to said rod and having openings arranged about the rod, the other of said discs being fixed to said rod and adapted to close said openings of said other disc and seat against same, means for permitting fluid about said shell to bleed therein, and vent means for dumping the high pressure from said shell to control operation of said valve.

2. An inline fluid valve comprising, a tubular casing having a circular inlet and a circular outlet axially aligned therewith, a cylindrical shell supported within said casing and having its longitudinal axis aligned axially with said inlet and said outlet, said shell coacting with said casing to define an annularly shaped fluid channel between said inlet and said outlet, the external diameter of said shell being no greater than the inlet diameter, the end of the shell adjacent the inlet being closed and the end of the shell adjacent the outlet being open, a piston rod axially supported in said shell, a piston mounted on said rod engaging the walls of the shell and defining a compartment with the closed end of the shell, spring means for continually biasing said piston rod towards said outlet, an annular seat at said outlet, first and second discs mounted on said piston rod outward of said shell and coacting with said seat to close said outlet, said first disc being floatingly mounted on said piston rod for limited axial movement therealong and being substantially equal in diameter to said piston, said first disc adapted to engage said seat, fluid passage means about said rod at said first disc, said second disc being fixedly mounted on said piston rod and adapted to seat against said first disc and to close said fluid passage means, means for bleeding fluid from said channel to said compartment, and means for selectively venting the compartment to a low pressure area.

3. An inline fluid valve comprising, a tubular casing having a circular inlet and a circular outlet axially aligned therewith, a cylindrical shell supported within said casing and having its longitudinal axis aligned axially with said inlet and said outlet, said shell coacting with said casing to define an annularly shaped air channel between said inlet and said outlet, the external diameter of said shell being no greater than the inlet diameter, the end of the shell adjacent the inlet being closed and the end of the shell adjacent the outlet being open, a piston rod axially supported in said shell, a piston mounted on said rod engaging the walls of the shell and defining a compartment with the closed end of the shell, spring means for continually biasing said piston rod towards said outlet, an annular seat at said outlet, first and second discs mounted on said piston rod outward of said piston, said discs adapted to coact with said seat to close said outlet, said first disc being sized to engage said seat and being axially slidable on said piston rod for limited movement therealong, said first disc being substantially equal in diameter to said piston, fluid passage means about said rod at said first disc, said second disc being fixed on said piston rod and of a size substantially smaller than said first disc, said second disc adapted to seat against said first disc and to open and close said fluid passage means, means for bleeding fluid from said channel to said compartment, and means for selectively venting the compartment to a low pressure area.

4. The combination as defined by claim 3, wherein said discs are bell-shaped.

5. The combination as defined by claim 3, wherein said discs are bell-shaped and the mouth-ends are facing said outlet.

6. The combination as defined by claim 3, wherein said venting means includes a solenoid operated valve.

7. The combination as defined by claim 6 wherein said venting means is connected downstream of the valve seat.

8. An inline air valve comprising, a tubular casing having an inlet and an outlet axially aligned therewith, a cylindrical shell supported within said casing and axially aligned with said inlet and outlet, the external diameter of said shell being no greater than that of the inlet, the end of said shell adjacent the inlet being closed and the end thereof adjacent the outlet being open, a piston received in said shell and having a piston rod axially and slidably supported therein, spring means normally biasing said piston toward said outlet, a seat at said outlet, first and second discs mounted on said rod and coacting with said seat to close said outlet, one of said discs being substantially equal in diameter to said piston and being adapted to engage said seat and being floatingly connected to said rod and having openings arranged about the rod, the other of said discs being fixed to said rod and adapted to close said openings of said other disc and seat against same, means for permitting air about said shell to bleed therein, and means for selectively venting said shell to atmosphere to control operation of said valve.

9. An inline fluid valve comprising, a tubular casing having an inlet and an outlet axially aligned therewith, a cylindrical shell supported within said casing and axially aligned with said inlet and outlet, the external diameter of said shell being no greater than that of the inlet, the end of said shell adjacent the inlet being closed and the end thereof adjacent the outlet being open, a piston received in said shell and having a piston rod axially and slidably supported therein, spring means normally biasing said piston toward said outlet, a seat at said outlet, first and second discs mounted on said rod and coacting with seat to close said outlet, one of said discs being substantially equal in diameter to said piston and being adapted to engage said seat and being floatingly connected to said rod and having openings arranged about the rod, the other of said discs being fixed to said rod and adapted to close said openings of said other disc and seat against same, means for permitting fluid about said shell to bleed therein, a line connected between said shell and the downstream side of said seat, and valve means in said line to selectively dump high pressure fluid from said shell to the downstream side of said seat.

10. An inline air valve comprising, a tubular casing having an inlet and an outlet axially aligned therewith, a cylindrical shell supported within said casing and axially aligned with said inlet and outlet, the external diameter of said shell being no greater than that of the inlet, the end of said shell adjacent the inlet being closed and the end thereof adjacent the outlet being open, a piston received in said shell and having a piston rod axially and slidably supported therein, spring means normally biasing said piston toward said outlet, a seat at said outlet, first and second discs mounted on said rod and coacting with said seat to close said outlet, one of said discs being substantially equal in diameter to said piston and being adapted to engage said seat and being floatingly connected to said rod and having openings arranged about the rod, the other of said discs being fixed to said rod and adapted to close said openings of said other disc and seat against same, means for permitting air about said shell to bleed therein, a line interconnecting said shell to atmosphere, and valve means in said line to selectively dump high pressure fluid from said shell to atmosphere.

References Cited by the Examiner

UNITED STATES PATENTS

| | | | |
|---|---|---|---|
| 2,329,001 | 9/43 | Robinson | 251—44 XR |
| 3,076,471 | 2/63 | Salerno | 137—219 |

FOREIGN PATENTS

| | | |
|---|---|---|
| 1,054,190 | 10/53 | France. |
| 287,719 | 3/28 | Great Britain. |

M. CARY NELSON, *Primary Examiner.*